US008924567B1

(12) United States Patent
Simoes et al.

(10) Patent No.: US 8,924,567 B1
(45) Date of Patent: Dec. 30, 2014

(54) SIP SERVICE WRAP (75) Inventors: Renato Simoes, Ottawa (CA); Shawn O'Reilly, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 563 days.

(21) Appl. No.: 12/201,565

(22) Filed: Aug. 29, 2008

(51) Int. Cl.
G06F 15/16 (2006.01)
H04L 12/16 (2006.01)
H04B 7/00 (2006.01)

(52) U.S. Cl.
USPC .......................... 709/227; 370/260; 455/518

(58) Field of Classification Search
USPC .................................. 370/259; 709/204, 227
See application file for complete search history.

(56) References Cited

U.S. PATENT DOCUMENTS

| | | | | |
|---|---|---|---|---|
| 6,031,835 | A * | 2/2000 | Abali et al. ................... | 370/388 |
| 6,564,261 | B1 * | 5/2003 | Gudjonsson et al. ......... | 709/227 |
| 6,678,735 | B1 * | 1/2004 | Orton et al. ................... | 709/230 |
| 6,751,216 | B2 * | 6/2004 | Johnson et al. ............... | 370/352 |
| 7,085,260 | B2 * | 8/2006 | Karaul et al. ................. | 370/352 |
| 7,136,372 | B1 | 11/2006 | Nilsen | |
| 7,225,226 | B2 * | 5/2007 | Fitzpatrick et al. ........... | 709/205 |
| 7,400,881 | B2 * | 7/2008 | Kallio .......................... | 455/412.2 |
| 7,417,988 | B1 * | 8/2008 | Tripathi et al. ............... | 370/389 |
| 7,522,579 | B1 * | 4/2009 | Mangal et al. ................ | 370/352 |
| 7,535,915 | B2 * | 5/2009 | Collins ......................... | 370/410 |
| 7,656,870 | B2 * | 2/2010 | Ravikumar et al. ........... | 370/389 |
| 2002/0143874 | A1 * | 10/2002 | Marquette et al. ............ | 709/204 |
| 2002/0194378 | A1 * | 12/2002 | Foti .............................. | 709/246 |
| 2003/0163545 | A1 * | 8/2003 | Koskelainen et al. ........ | 709/217 |
| 2004/0249951 | A1 * | 12/2004 | Grabelsky et al. ............ | 709/227 |
| 2005/0033808 | A1 * | 2/2005 | Cheng et al. .................. | 709/205 |
| 2006/0050692 | A1 * | 3/2006 | Petrescu et al. ............... | 370/389 |
| 2006/0104306 | A1 * | 5/2006 | Adamczyk et al. ........... | 370/466 |
| 2006/0165074 | A1 * | 7/2006 | Modi et al. .................... | 370/389 |
| 2006/0209791 | A1 * | 9/2006 | Khadri et al. ................. | 370/352 |
| 2007/0232332 | A1 * | 10/2007 | Holur ........................... | 455/461 |
| 2007/0259651 | A1 * | 11/2007 | Bae et al. ..................... | 455/412.1 |
| 2007/0274492 | A1 * | 11/2007 | Baker et al. .................. | 379/202.01 |
| 2007/0298817 | A1 * | 12/2007 | Alfano et al. ................. | 455/466 |
| 2008/0159262 | A1 * | 7/2008 | Crable et al. ................. | 370/352 |
| 2008/0171549 | A1 * | 7/2008 | Hursey et al. ................ | 455/445 |
| 2008/0181208 | A1 * | 7/2008 | Maes ............................ | 370/389 |
| 2008/0301785 | A1 * | 12/2008 | Beyer et al. .................. | 726/5 |
| 2009/0177784 | A1 * | 7/2009 | Olson et al. .................. | 709/228 |
| 2009/0190573 | A1 * | 7/2009 | Siegel et al. .................. | 370/352 |
| 2009/0191873 | A1 * | 7/2009 | Siegel et al. .................. | 455/435.2 |
| 2009/0296606 | A1 * | 12/2009 | Ravikumar et al. ........... | 370/259 |
| 2010/0079277 | A1 * | 4/2010 | Farah et al. ................... | 340/539.13 |
| 2010/0177771 | A1 * | 7/2010 | Buckley et al. ............... | 370/352 |
| 2010/0198716 | A1 * | 8/2010 | Chatzky et al. ............... | 705/37 |
| 2011/0134843 | A1 * | 6/2011 | Noldus et al. ................ | 370/328 |
| 2012/0044802 | A1 * | 2/2012 | Gu et al. ....................... | 370/221 |
| 2012/0185604 | A1 * | 7/2012 | Shatsky ........................ | 709/228 |
| 2012/0300677 | A1 * | 11/2012 | Forsberg et al. .............. | 370/261 |

* cited by examiner

*Primary Examiner* — Krista Zele
*Assistant Examiner* — Margishi Desai
(74) *Attorney, Agent, or Firm* — Sheridan Ross P.C.

(57) ABSTRACT

Methods, devices, and systems for creating an intermediate layer between a SIP endpoint and a SIP service. The intermediate layer may operate to provide a greater flexibility in quickly adapting to customer requirements and/or requests of the SIP service that would, without the intermediate layer, have to wait for long release cycles and request changes directly from the SIP service. The intermediate layer provides a way of increasing the set of features provided to SIP endpoints around the SIP service without changing the SIP service itself.

20 Claims, 10 Drawing Sheets

SIP SERVICE WRAP

FIELD OF THE INVENTION

The invention relates generally to communication systems and more particularly to any upgradeable communication application.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant (PDA), cellular phone, IM client, IP phone, traditional telephone, and so on.

One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Figure 1:
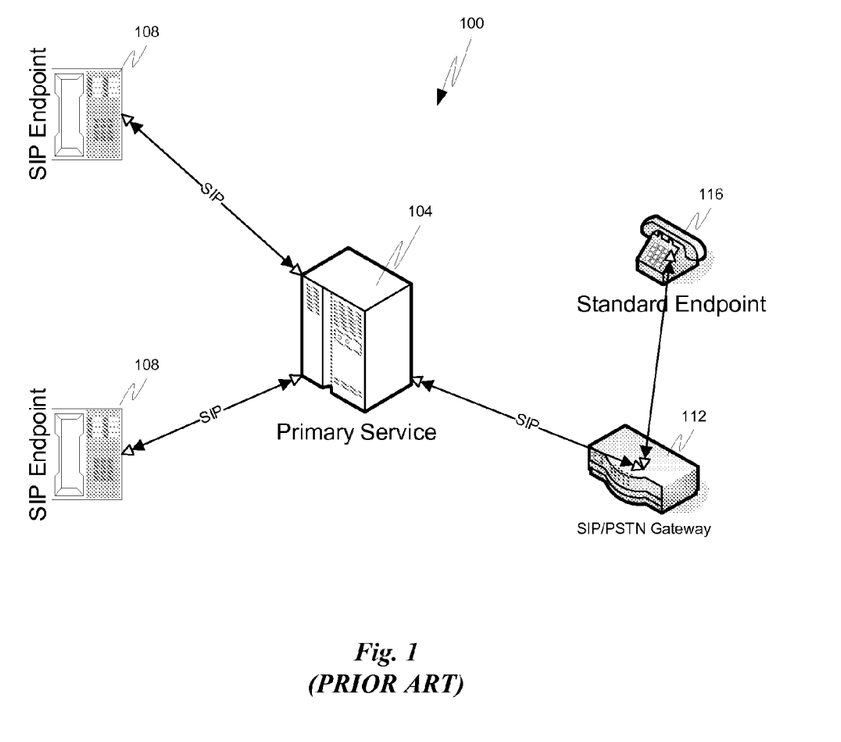
FIG. 1 is a block diagram depicting a communication system in accordance with embodiments of the prior art.

With reference to FIG. 1, a communication system 100 comprising a primary service 104 interacting with a number of SIP devices (e.g., a SIP endpoint 108 or User Agent (UA) and/or a SIP/PSTN Gateway 112) will be discussed in accordance with embodiments of the prior art. The SIP/PSTN Gateway 112 may be utilized to connect other non-SIP enabled devices such as a standard telephone 116 to the primary service 104.

The primary service 104 provides one or more features (e.g., SIP features and functions, PBX features and functions, etc.) to the endpoints connected thereto. A SIP primary service is only one example of the kinds of primary services that may be provided to communication endpoints by a central server or the like. The primary service 104 may be maintained and executed by one or more servers. As an example, the primary service 104 may be executed by a SIP server working in conjunction with a call server. Alternatively, the primary service 104 may be executed by a single server as is depicted in FIG. 1. As can be appreciated by one skilled in the art, the types and/or number of devices used to provide the primary service 104 may vary depending upon the nature of the primary service.

The SIP endpoint 108 may comprise any type of SIP-enabled communication device such as a SIP enabled phone, a personal computer, a laptop, a portable electronic mail retrieval device, or the like. The standard endpoint 116 may correspond to an analog or digital phone or any other traditional communication device.

One downside to this particular communication system 100 configuration is that if additional features need to be made available to the SIP Phones 108, the SIP/PSTN Gateway 112, or other SIP devices connected to the primary service 104, then an enhancement (or new release) of the primary service 104 needs to be provided/installed. Upgrading the primary service 104 itself can be very time consuming and lag times for such upgrades can be as long as a year or more. These lag times often do not meet a customer's time-to-market needs. The long lag time of primary service 104 enhancements is usually because the primary service 104 has to enter a product road map. A further risk to some customers is that their requested feature might not even make it into the road map as the feature to be added might be considered too specific to a single customer to be part of the primary service 104.

Figure 2:
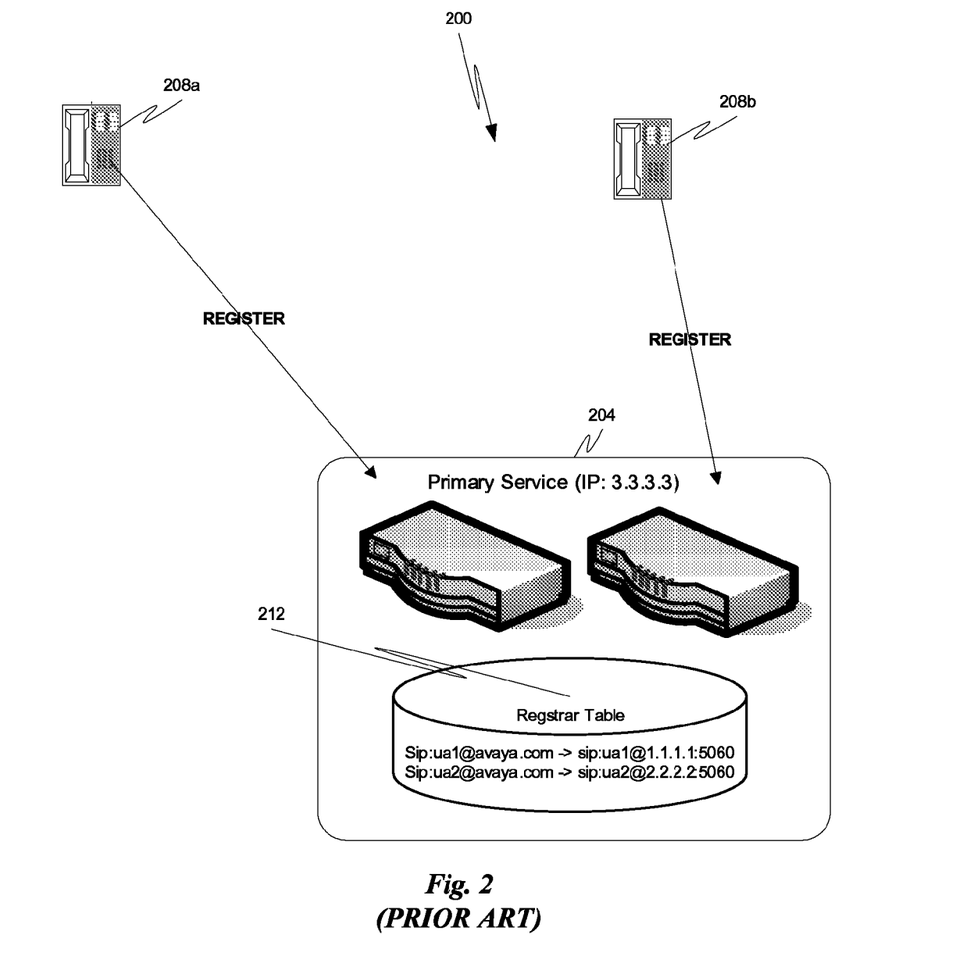
FIG. 2 is a block diagram depicting endpoint registration with a primary service in accordance with embodiments of the prior art.
Figure 3:
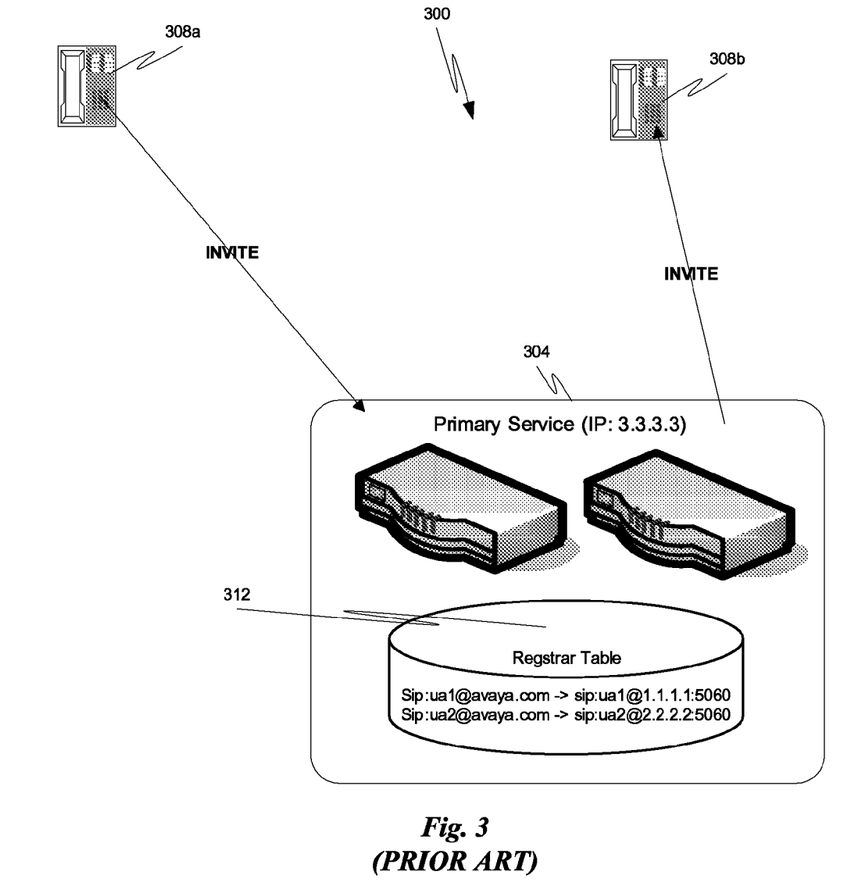
FIG. 3 is a block diagram depicting message flows through a primary service in accordance with embodiments of the prior art.

Operations of the communication system 200 will now be discussed in connection with FIGS. 2 and 3. Registration of the endpoints 208a and/or 208b with the primary service 204 will now be described with reference to FIG. 2. During registration with the primary service 204, the first 208a and/or second SIP endpoint 208b sends a REGISTER message to primary service 204. Along with the REGISTER message directed to the primary service 204, the first SIP endpoint 208a may send details of the SIP Address (public name, e.g.: sip:ual@avaya.com) and the Contact Address (physical location, e.g.: sip:ual@1.1.1.1:5060) to the primary service 204.

The OutboundProxy configuration attribute in the endpoint 208a indicates where the primary service 204 is located (e.g., IP: 3.3.3.3). The OutboundProxy is a single phone configuration parameter that indicates where SIP messages such as the REGISTERs and INVITES should be sent. One of the functions of the primary service 204 is to work as a Registrar for the endpoints 208a, 208b. The primary service 204 can then capture the registration information and store it in a database 212. This database 212 (e.g., a registrar table) will then contain a mapping between the public name (e.g.: sip:ual@avaya.com) and the physical location (e.g.: sip:ual@1.1.1.1:5060).

In addition to acting as a registrar, the primary service 204 may support SIP call handling functions for the endpoints 208a, 208b. More specifically, FIG. 3 depicts a communication system 300 where a first endpoint 308a initiates a call to a second endpoint 308b. The first endpoint 308a may send an INVITE to the second endpoint 308b. The first endpoint 308a does not know where the second endpoint 308b is physically located, but it does know the public address of the second endpoint 308b (e.g.: sip:ua2@avaya.com).

Using the OutboundProxy configuration (IP: 3.3.3.3), the first endpoint 308a sends the INVITE to the primary service 304, so that the primary service 304 can resolve the public address of the second endpoint 308b. Upon receiving the INVITE, the primary service 304 resolves the public address of the second endpoint 308b into sip:ua2@2.2.2.2:5060 by performing a database lookup of its Registrar Table 312.

The primary service 304 then forwards the INVITE to the second endpoint 308b via the address determined during the database lookup. It should be noted that the ReqURI now contains the proper physical location of the second endpoint 208b, and the Contact Address contains the address of the primary service 204. This is to force future messages from either endpoint 208 to be sent back to primary service 204 so it stays in the signaling path.

SUMMARY

What is needed is an alternative communication system that will make it possible to increase the set of features provided to the endpoints around a primary service without changing the primary service itself. As one example, imagine there is some SIP Service that provides functionality to SIP endpoints (SIP phones, gateways, etc.), embodiments of the present invention can be used to wrap the SIP Service, which is one example of a primary service, and position itself between these SIP endpoints and the SIP Service. An objective being to provide a clean and generic mechanism for enhancing the SIP Service's set of functionality without having to change either the SIP Service or the SIP endpoints.

Thus, features provided to the SIP endpoints can be updated without going through the time consuming act of updating the SIP Service itself, thereby allowing feature updates to be implemented more quickly than has previously been possible.

In accordance with at least one embodiment of the present invention, a method is provided, the method generally comprising:

receiving a message from a first endpoint, the message being directed toward a primary service;

analyzing the message to determine whether a feature has been requested by the first endpoint;

determining whether the primary service is capable of providing the requested feature; and directing and/or processing the message based on results of the determining step.

Each of the steps of the method may be performed by an intermediate device or collection of devices generally referred to herein as a service wrap or service wrap framework. The service wrap is provided as an abstraction of the primary service contained within the service wrap. Accordingly, the service wrap intercepts messages bound for the primary service and/or emanating from the primary service and makes routing or processing determinations for the message based on a feature analysis performed on the message. Thus, the service wrap may be enabled to process the message and provide a particular feature or the service wrap may be enabled to transfer the message to another network device that is capable of providing the feature. Moreover, the service wrap can alter addressing properties of the message to ensure that all messages into and out of the primary service pass through the service wrap.

The term "wrap" utilized herein is used to indicate that most or all requests in or out of the primary service (e.g., a SIP service provider) will be forced to go through the service wrap (e.g., a SIP Service Wrap). This gives the service wrap the opportunity to manipulate messages that pass through it and achieve additional functionality not currently provided by the primary service being wrapped.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions or data to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to provide an abstraction of a primary service or application.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Although certain embodiments of the present invention are discussed in connection with a primary service being a SIP-based service, one skilled in the art will appreciate that embodiments of the present invention can be equally useful when applied to non-SIP-based primary services. More particularly, any type of service provided by one computing device to another computing device may be enhanced with a service wrap according to embodiments of the present invention. Examples of other such services that may be wrapped to enhance their functionality include, but are not limited to, PBX, SBC, an application running on a SIP Application Server, Subscribe/Notify application, Instant Messaging, and/or any SIP endpoint or service acting as a UAs or UAC.

Figure 4:
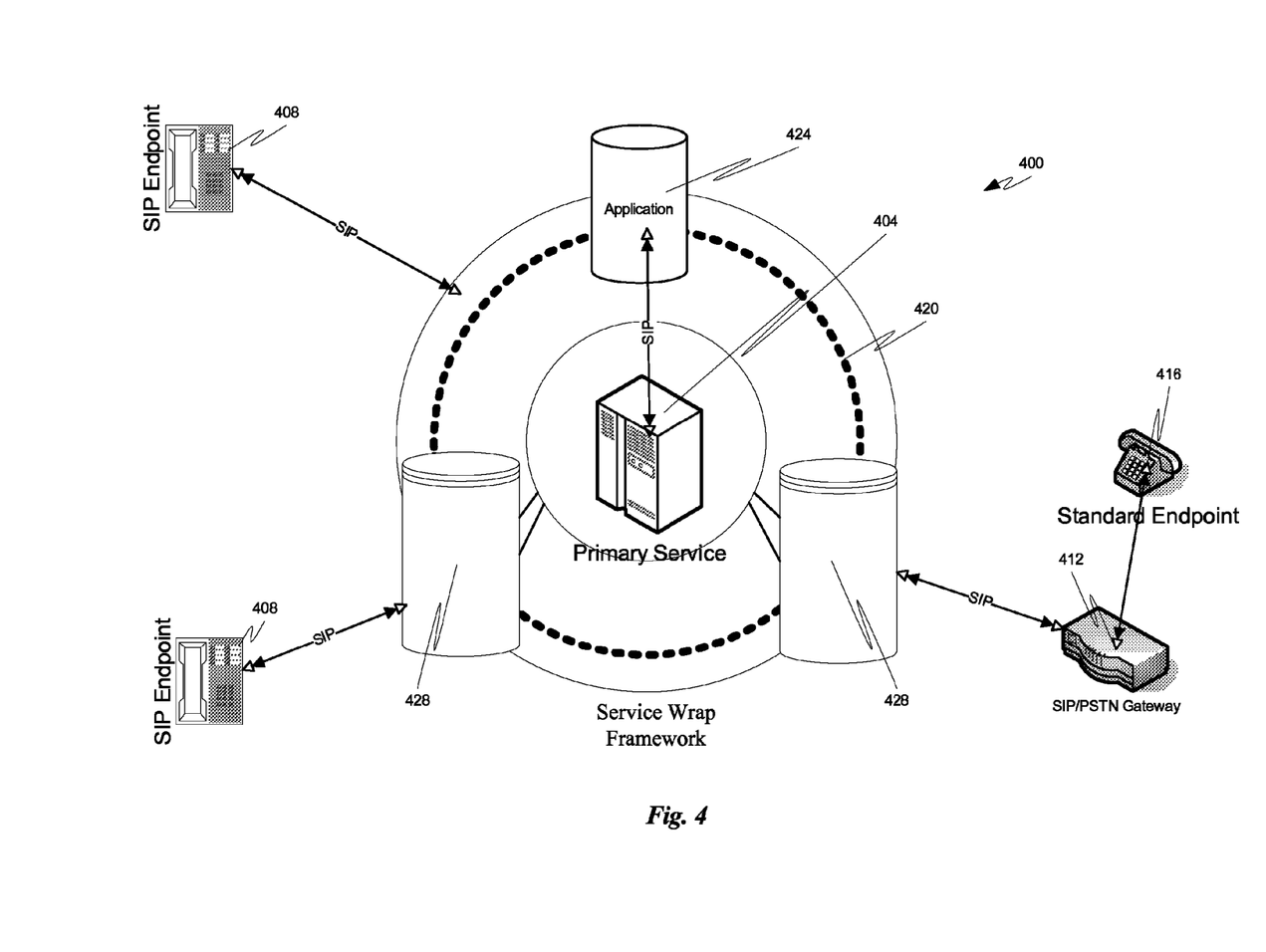
FIG. 4 is a block diagram depicting a communication system in accordance with at least some embodiments of the present invention.

With reference to FIG. 4, an exemplary communication system 400 will be described in accordance with at least some embodiments of the present invention. The communication system 400 may comprise a primary service 404 in communication with a plurality of SIP endpoints 408 and/or standard endpoints 416 via a SIP/PSTN Gateway 412. In accordance with at least some embodiments of the present invention, the communication system 400 is similar to the communication systems 100 of the prior art except that the primary service 404 is wrapped in a service wrap framework 420. The service wrap framework 420 may comprise applications 424, 428 or services that are meant to supplement and/or enhance the primary service 404. In addition to the supplemental applications(s) 424, 428, the service wrap framework 420 may also comprise routing mechanisms for intercepting and re-routing messages directed toward or emanating from the primary service 404. These routing mechanisms may be part of the applications 424, 428 themselves or may be separate routing mechanisms located at the border of the service wrap framework 420 (i.e., between the primary service 404 and the endpoints 408, 412).

In accordance with at least some embodiments of the present invention, all messages (e.g., SIP messages) in and out of the primary service 404 are intercepted by a routing mechanism where it is determined if the message should be re-routed to an application 424, 428 that makes use of the service wrap framework 420 before it is eventually transferred to the primary service 404. This interception gives the applications 424, 428 the opportunity to extend the existing functionality of the primary service 404, without having to change the primary service 404 itself. Instead, de facto updates to or extensions to the functionality of the primary service 404 may be achieved by updated one or more of the applications 424, 428 in the service wrap framework 420.

The implementation of embodiments of the present invention gives a greater flexibility in quickly adapting to customer requirements, that otherwise would have to wait for long release cycles and request changes for the primary service 404 (e.g., a SIP Service).

In accordance with at least some embodiments of the present invention, a service wrap framework 420 comprises a SIP Service Wrap, which can be implemented as a library to be installed on a SIP Application Server, for example. The purpose of the SIP Service Wrap is to wrap (i.e., encapsulate or hide) the SIP messages from and to the wrapped SIP Service (i.e., the primary service 404), so an application 424, 428 living in the SIP Service Wrap framework can provide specific business logic. In other words, SIP Service Wrap as well as any other service wrap framework 420 discussed herein is a framework and is generic; applications 424, 428 running on a server that make use of the service wrap framework 420 are the ones responsible for implementing various customer requirements and extensions to the primary service 404.

Figure 5:
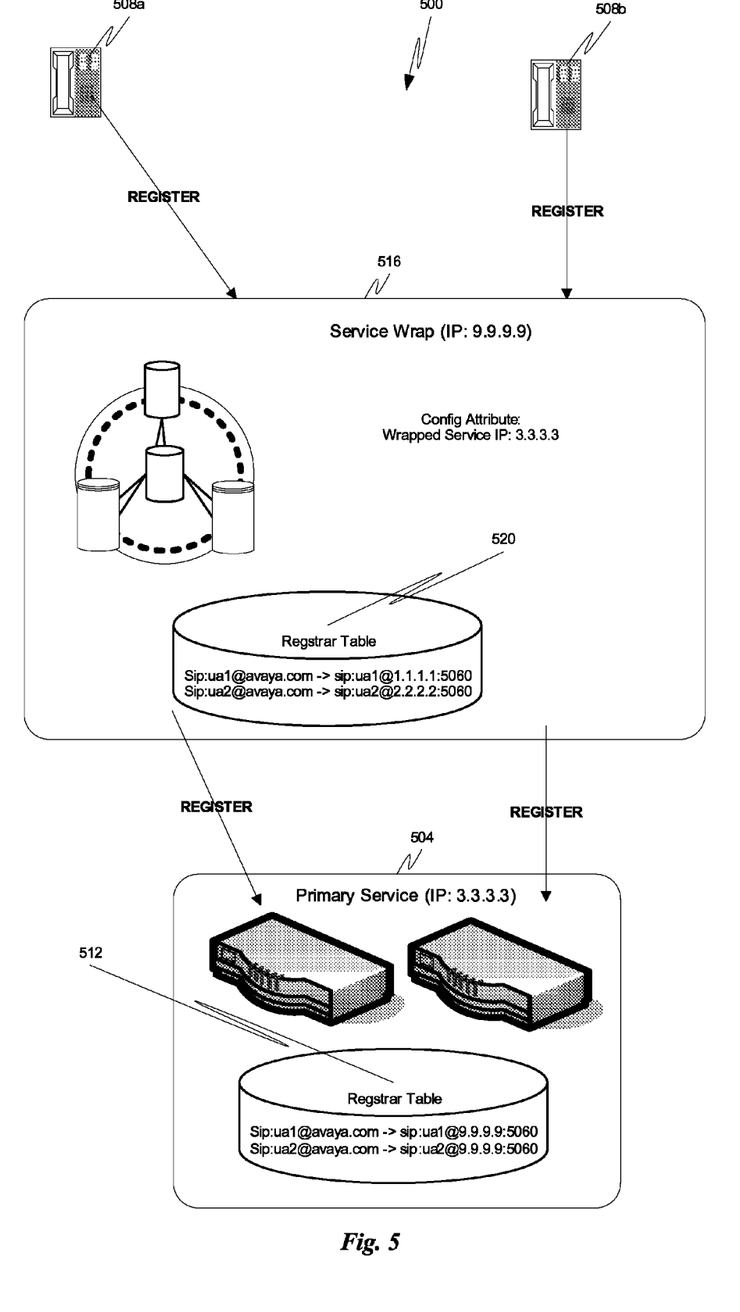
FIG. 5 is a block diagram depicting endpoint registration with a primary service in accordance with at least some embodiments of the present invention.

With reference now to FIG. 5, further details of how a SIP endpoint 508*a*, 508*b* registers with a primary service 504 in a communication system 500 will be described in accordance with at least some embodiments of the present invention. Similar to the registration process of the prior art, an endpoint 508*a*, 508*b* sends a REGISTER message toward the primary service 504. The difference now is that the phone's OutboundProxy is configured to point to the service wrap 516 (i.e., the server cluster surrounding the primary service 504) at (IP: 9.9.9.9).

Upon receiving the REGISTER message, the service wrap 516 then writes in its Registrar Table 520, the mapping between the endpoint 508 public name (e.g.: sip:ual@avaya.com) and its physical location (sip:ual@1.1.1.1: 5060).

Thereafter, the service wrap 516 proxies the REGISTER request to the primary service 504, but first it manipulates the Contact Address of the REGISTER to have the IP of the service wrap 516 (IP: 9.9.9.9) instead of the endpoint 508 physical location. In accordance with at least some embodiments of the present invention, the service wrap 516 may be enabled to know where to proxy the REGISTER to via a SAR configuration attribute: the "Wrapped Service IP" (e.g.: 3.3.3.3).

The primary service 504 then receives the REGISTER request and "thinks" it was sent directly from an endpoint 508. The primary service 504 will then update its own Registrar Table 512 with the endpoint 508 contact name, and the physical location that contains the service wrap 516 (e.g.: sip:ual@9.9.9.9:5060).

For most purpose the primary service 504 "thinks" the endpoints 508*a*, 508*b* are located at the service wrap 516. Depending on the endpoint 508 or even in the connection type, it is possible that the primary service 504 challenges the endpoint 508 for its credential (e.g., the primary service 504 sends a 401 Unauthorized message to the endpoint 508). In this case, the 401 message will arrive at the service wrap 516 SAR which will simply propagate it over to the endpoint 508, so the endpoint 508 can construct a new REGISTER message with the proper authentication parameter.

Figure 6:
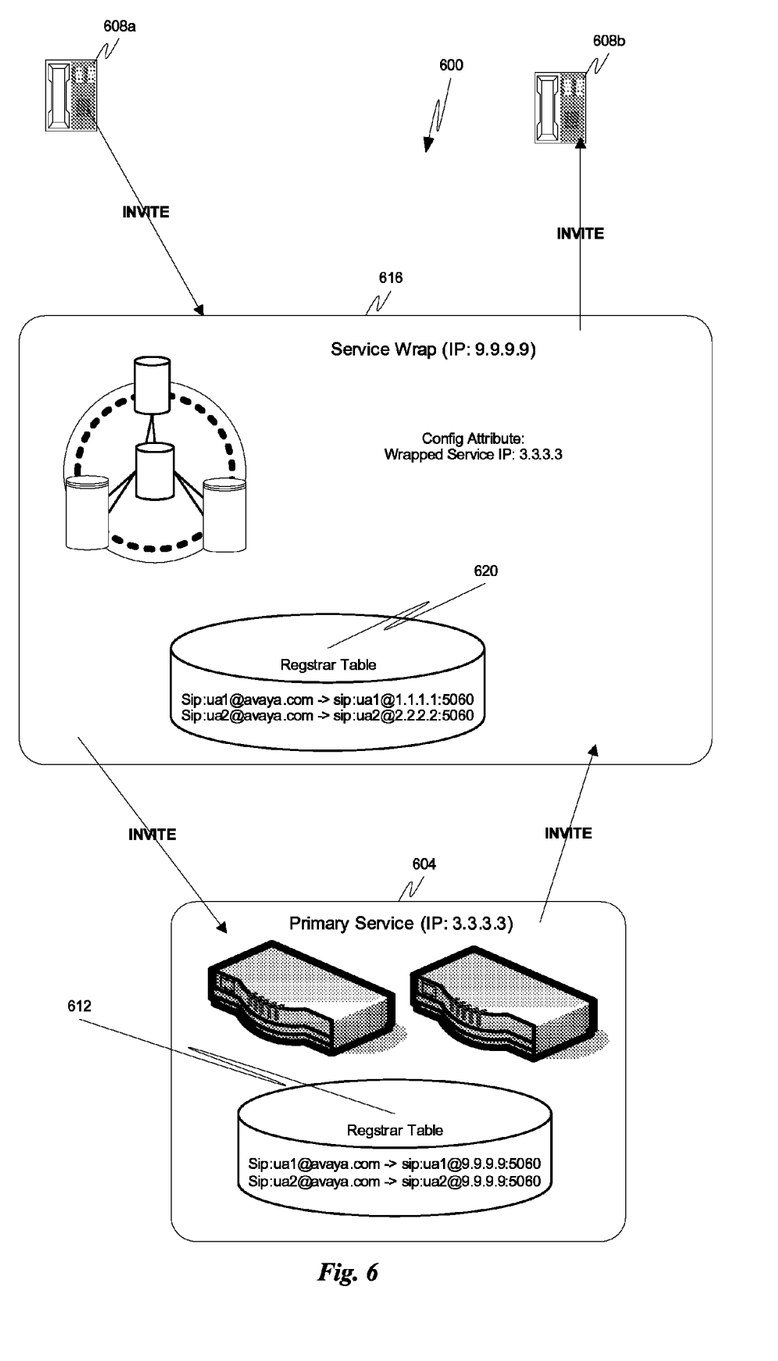
FIG. 6 is a block diagram depicting message flows through a primary service in accordance with at least some embodiments of the present invention.

Referring now to FIG. 6, call handling within a communication system 600 will be described in accordance with at least some embodiments of the present invention. The primary service 604 may handle call signals originating from the endpoints 608*a*, 608*b* in cooperation with the service wrap 616. Similar to the call handling process of the prior art, the first endpoint 608*a* sends an INVITE directed toward the second endpoint 608*b*. The first endpoint 608*a* does not know where the second endpoint 608*b* is physically located, but it does know the public address of the second endpoint 608*b* (sip:ua2@avaya.com).

Using the OutboundProxy configuration (IP: 9.9.9.9), the first endpoint 608*a* sends the INVITE to the service wrap 616 rather than directly to the primary service 604. Upon receiving the INVITE, the service wrap 616 stays on the path via a Back-to-Back User Agent (B2BUA) configuration and forwards the request to primary service 604 (using the SAR "Wrapped Service IP" configuration parameter as the host name for the requestURI, IP: "3.3.3.3", in this case).

Upon receiving the INVITE message, the primary service 604 applies any forwarding or other configuration/functionality it might have and resolves the public address of the second endpoint 608*b* into sip:ua2@9.9.9.9:5060 by a database lookup of its Registrar Table 612, where 9.9.9.9 is the IP of the service wrap 616. Again, the service wrap 616 is a B2BUA, but now for the outbound (i.e., callee) leg. The INVITE is then forwarded to the second endpoint 608*b* via the service wrap 616 after the service wrap has resolved the public name of the second endpoint 608*b* into its real physical location (sip:ua2@2.2.2.2:5060) (e.g., via a database lookup in its registrar table 620).

The "wrap" described above is achieved by configuring the outboundProxy used by the endpoint 608 to be redirected to an auxiliary service in the service wrap 616 framework; by configuring the service wrap 616 to know where the primary service 604 resides (e.g., know the IP address needed to reach the primary service 604); and by distorting the contact addresses in the intermediate registrar table 620. All of these steps help assure that the primary service 604 only sees the redirecting or application server in the service wrap 616 as an endpoint. Additionally, the endpoints 608 (caller and callee) only see the service wrap 616 as an endpoint. The final result is that the service wrap 616 will stay on the signaling path between the endpoints 608 and the primary service 604 doing any signaling manipulation needed to handle specific services that are not currently handled by the primary service. In other words, the service wrap 616 facilitates an application to provide extra functionality to the primary service without having to change the primary service in any way.

Figure 7:
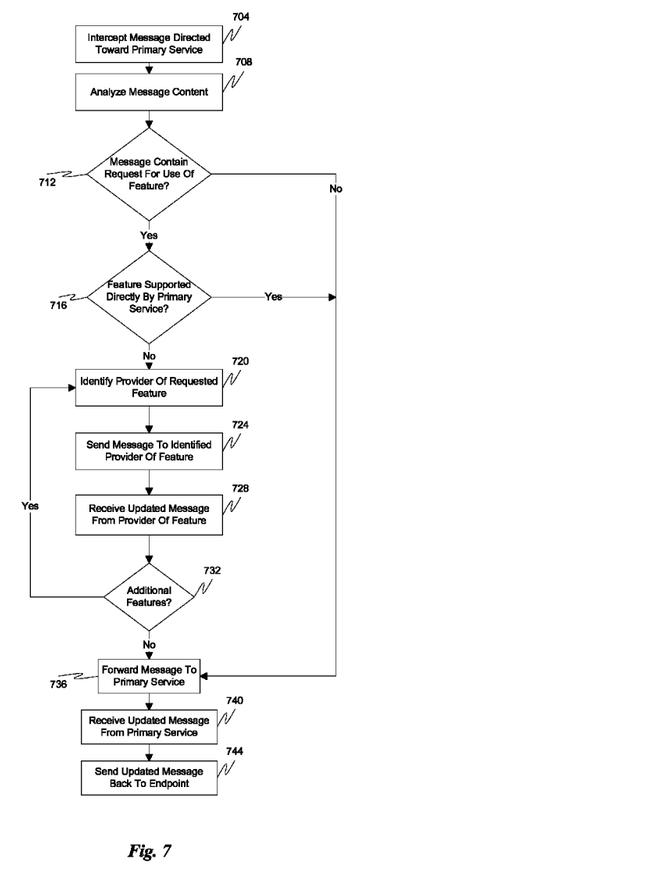
FIG. 7 is a flow diagram depicting a message handling method in accordance with at least some embodiments of the present invention.

Referring now to FIG. 7, an exemplary communications method will be described in accordance with at least some embodiments of the present invention. The method is initiated when a message directed toward the primary service is intercepted by a service wrap (step 704). Upon intercepting the message, the service wrap analyzes the message content. More specifically, the service wrap analyzes the headers, footers (if any), and the body of the message to identify the sender of the message as well as the intended recipient of the message (i.e., the primary service).

Based on this analysis step, the service wrap determines whether the message contains a request for use of a feature or whether the message corresponds to a generic message and does not contain a request for features (step 712). If the service wrap determines that at least one feature is being requested based on the content of the message, then the method continues with the service wrap determining whether the primary service is capable of directly supporting or providing all of the requested features (step 716). Namely, the service wrap may compare the requested features of the message to a list of features that are supported by the primary service. This particular table may be maintained in the memory of the service wrap and may be updated as the primary service is updated.

In the event that at least one requested feature is not supported by the primary service, then the service wrap identifies the provider or application server that is capable of providing the requested feature (step 720). In this step, the service wrap may reference its database of service wrap framework servers and their related applications. Furthermore, the service wrap may have knowledge about other application servers that are external to the service wrap but are capable of providing the requested feature that is not supported by the primary service. Each of these tables may also be maintained in memory at the service wrap level and may also be updated as each of the auxiliary services are updated. Advantageously, the auxiliary services may be updated without requiring the primary service to be updated. Accordingly, the service wrap should have its auxiliary tables updated as the auxiliary services are updated regardless of whether or not the primary service has been updated.

After the service wrap has identified at least one provider of the requested feature that is not supported by the primary service, the service wrap sends the message requesting the feature to the identified provider (step 724). In this step, the service wrap alters the content of the message such that the to/from information of the message is changed. More specifically, the service wrap may modify the received message in transit such that it is redirected to the identified feature provider but is returned to the service wrap after the identified feature provider has performed its necessary functions. To accomplish this task, the service wrap hides the original sender's address and replaces it with its own address. This causes the identified feature provider to think the service wrap is requesting the service and not the original endpoint, thereby causing the identified feature provider to send the message back to the service wrap (step 728).

After the service wrap receives the message back from the identified feature provider, the service wrap determines whether any additional features were requested that are not supported by the primary service (step 732). If there are any additional requested features that are not supported by the primary service, then the method returns to step 720. Otherwise, or in the event that the message did not contain any feature requests or in the event that all of the requested features are supported by the primary service, the method proceeds with the service wrap forwarding the message to the primary service (step 736). During this step, the service wrap may alter the message such that its address replaces the address of the originating endpoint, thus causing the primary service to think that the service wrap sent the primary service the message.

At this point the primary service will process the message as if the message were received directly from the originating endpoint by executing any requested feature and/or performing any necessary tasks. Thereafter, the message is returned to the service wrap from the primary service since the message transferred to the primary service contained the service wrap's address in the originator field as opposed to the originating endpoint's information (step 740). Upon receiving the message back from the primary service, the service wrap will re-alter the message information causing the message to appear as though it was sent directly from the primary service to the endpoint (step 744). Advantageously, the service wrap has provided the callee with the requested features either via the primary service or via some auxiliary service by abstracting the primary service and selectively redirecting messages to auxiliary services and/or the primary service.

There are several reasons that a service wrap may be employed. One reason is because the primary service being wrapped is too complex and expensive to be changed directly. Another reason might be because a customer wants an enhancement on its primary service and the vendor is including this new feature request in the primary service road map, but the requested feature won't be available to the customer quickly enough to address its requirements if the feature update is performed via the primary service. Yet another reason would be because a customer wants an enhancement to the primary service, but the vendor is not planning on including the feature in the primary service because the vendor finds the feature too specific to that client or because it conflicts with other services. Still another reason would be to enable a common feature set across a non-uniform environment consisting of multiple vendors.

Figure 8:
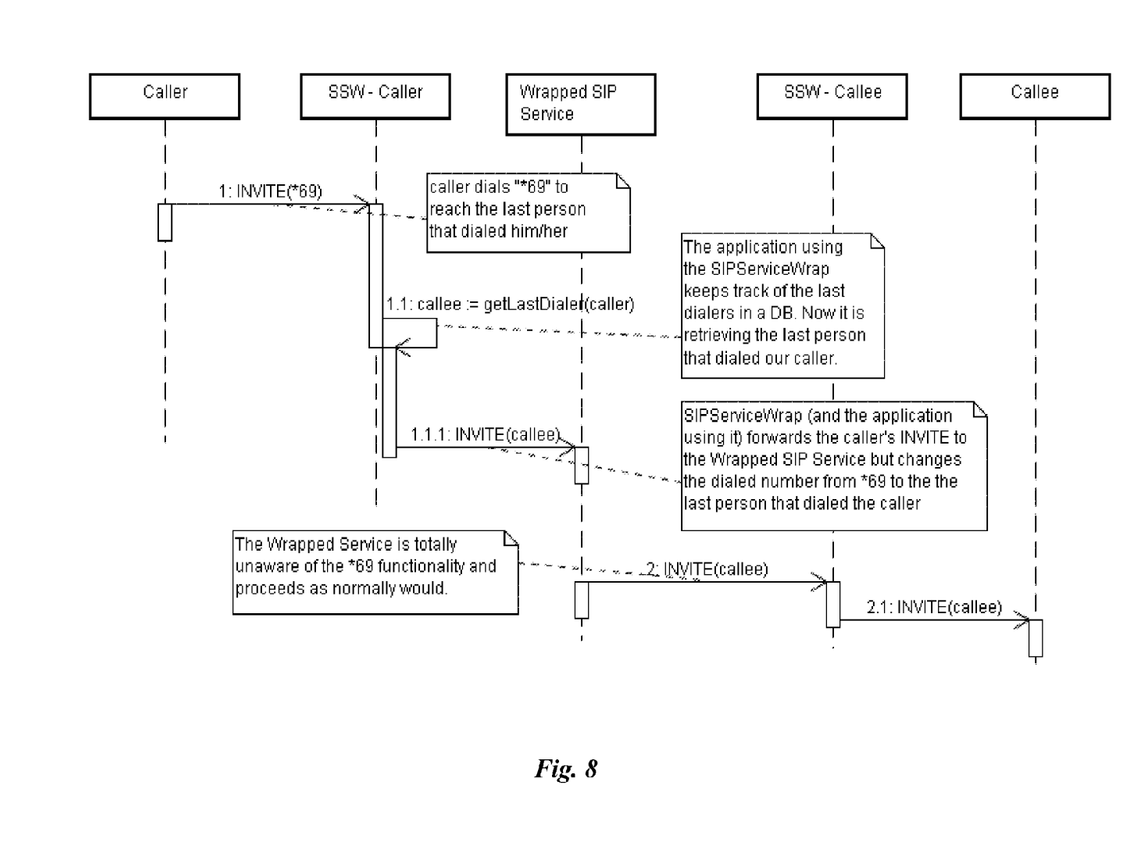
FIG. 8 is a signaling diagram depicting a call return feature in accordance with at least some embodiments of the present invention.
Figure 9:
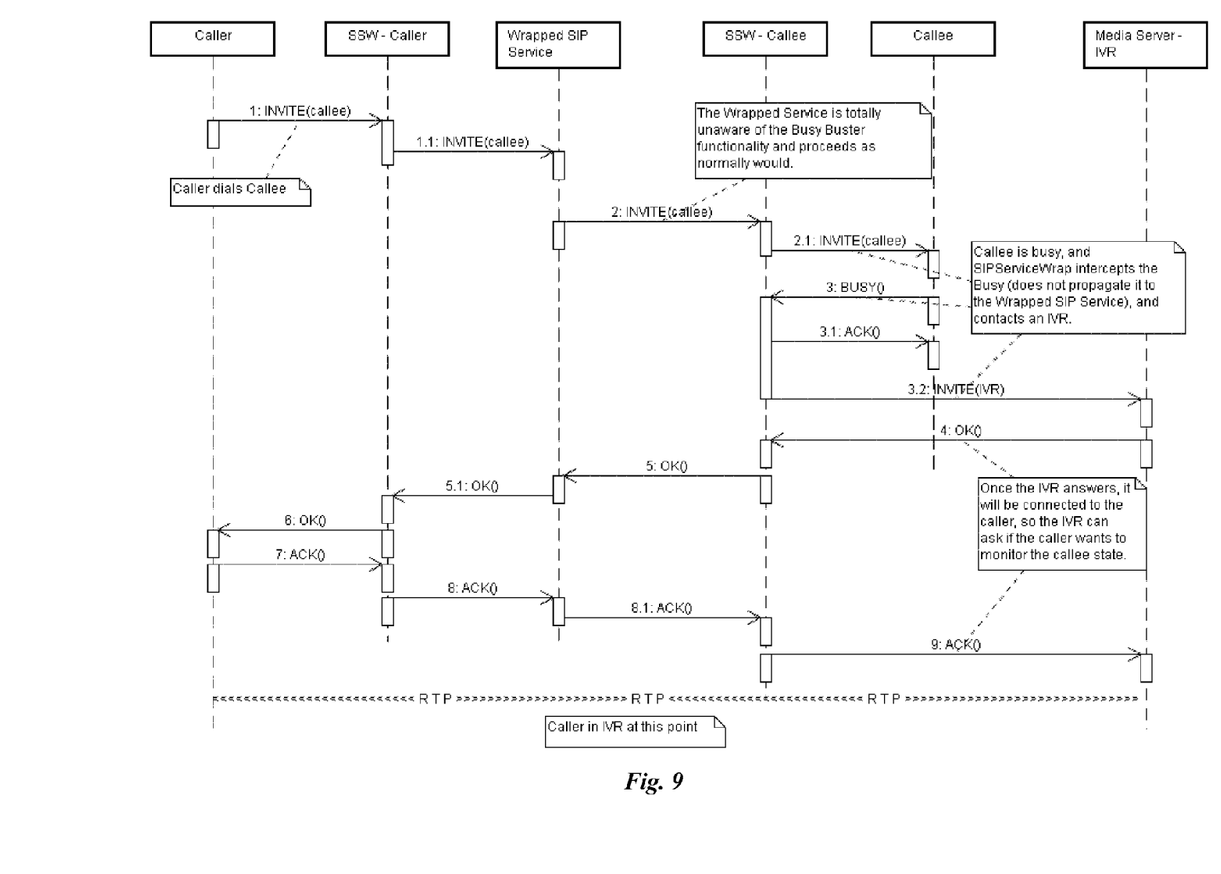
FIG. 9 is a signaling diagram depicting a busy buster feature in accordance with at least some embodiments of the present invention.
Figure 10:
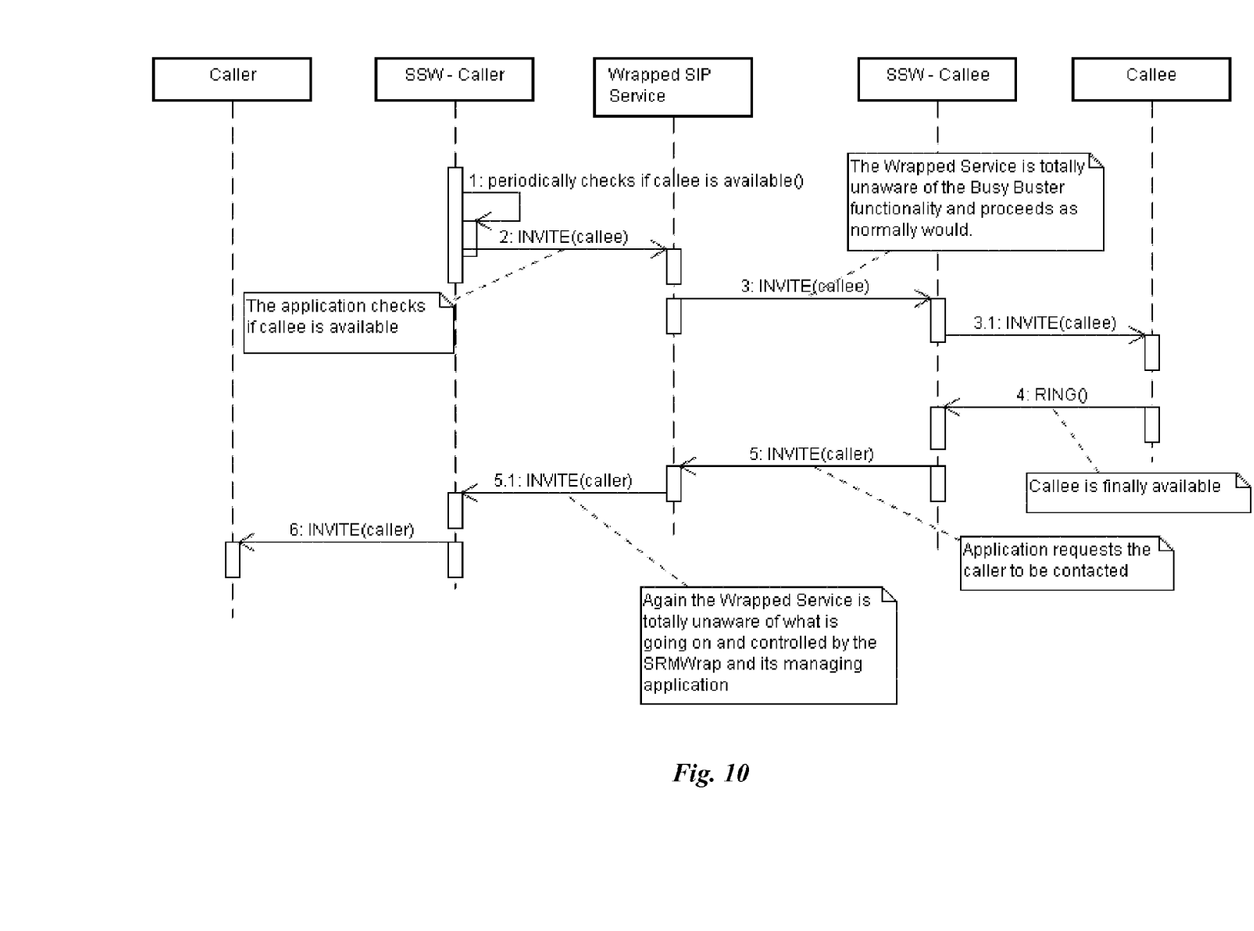
FIG. 10 is a signaling diagram depicting a continuation of the busy buster feature in accordance with at least some embodiments of the present invention.

Referring now to FIGS. 8-10, a number of different application examples are depicted in accordance with at least some embodiments of the present invention. It should be noted, however, that the examples provided herein are only a few scenarios that could be handled by using proposed service wrap concepts of the present invention. The features illustrated in the following examples provide sample applications that make use of the service wrap in order to extend the functionality provided to endpoints by a primary service, without changing the primary service.

With reference now to FIG. 8, an exemplary signaling diagram depicting a call return feature is depicted in accordance with at least some embodiments of the present invention. The call return feature to be added to the endpoints of the wrapped SIP service provides that if a caller dials "*69", the system should dial the last number that contacted the caller. As the application uses the SIP Service Wrap, the application has a way of intercepting the incoming call request from the caller and changing the SIP "To" header (and the ReqURI) from "*69" to an endpoint number according to the application database that keeps track of the last number dialed.

The sequence diagram illustrated in FIG. 8 shows the usage of the SIP Service Wrap by the application. On the diagram, the auxiliary application and the SIP Service Wrap it utilizes to perform the new function are generally referred to as "SSW" and has been divided into SSW-caller and SSW-callee simply for clarity. As can be appreciated, however, the SSW-caller and SSW-callee may be associated with the same device or collection of devices.

FIGS. 9 and 10 are a series of signaling diagrams depicting a busy buster feature in accordance with at least some embodiments of the present invention. The feature to be added to the endpoints of the wrapped SIP service provides that if a callee is busy, the system should place the caller into an Interactive Voice Response (IVR) and ask if the caller wants to monitor the callee status and once the callee is available it can contact the caller back and bridge the caller and callee together.

Again, by being positioned between the endpoints and the SIP Service, the SIP Service Wrap and the auxiliary application used in connection therewith can intercept callee Busy signaling and instead of forwarding the Busy message to the SIP Service, can place the caller into an IVR that asks if the monitoring should start as is depicted in FIG. 9. If the IVR confirms that monitoring is desired by the caller, then the system will keep trying to reach the callee for bridging the callee to the caller as is depicted in FIG. 10.

More specifically, FIG. 9 is a sequence diagram which illustrates the usage of the SIP Service Wrap by the application intercepting the Busy that comes from the callee and then places the caller into an IVR. On the diagram, the auxiliary application and the SIP Service Wrap it utilizes to perform the new function are generally referred to as "SSW" and has been divided into SSW-caller and SSW-callee simply for clarity. As can be appreciated, however, the SSW-caller and SSW-callee may be associated with the same device or collection of devices.

FIG. 10 is a sequence diagram which illustrates the usage of the SIP Service Wrap by the application that tries to contact the callee and if the callee is not busy it will contact the caller back and bridge the caller and callee. On the diagram, the auxiliary application and the SIP Service Wrap it utilizes to perform the new function is generally referred to as "SSW" and has been divided into SSW-caller and SSW-callee simply for clarity. As can be appreciated, however, the SSW-caller and SSW-callee may be associated with the same device or collection of devices. It should be noted that in the signaling depicted in FIG. 10, the bridging part has been omitted for clarity, but it would be simply a matter of utilizing the auxiliary application to send a re-INVITE message to force the exchange of SDP between the caller and callee. These details are basically application implementation details which are specific to this particular bridging feature and are not relevant for the overall use of the SIP Service Wrap.

By having the service wrap provide an auxiliary application the ability to fully control the call legs embodiments of the present invention allow the auxiliary application to provide the endpoints with a whole new set of service and not be limited to the primary service's limitations/restrictions.

Embodiments of the present invention utilize a service wrap that treats the primary service as a black box and does not intrude its functionality in any way. Moreover, the service wrap does not need to know how each function of the primary service works, how the functionality is implemented, what database server the primary service utilizes, or how its database schema is structured. Rather, the service wrap only needs to be capable of abstracting the primary service to endpoints and providing a mechanism to determine if the primary service is adapted to support all features requested by the endpoint. Otherwise, the primary service is allowed to function normally as if it were not wrapped at all.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for creating a service wrap, such as a SIP service wrap. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, at a service wrap framework, a message from a first endpoint, the message being directed toward a primary service that is wrapped within the service wrap framework, wherein the service wrap framework comprises applications or services that supplement or enhance the primary service, and wherein the service wrap framework comprises routing mechanisms for intercepting and re-routing messages directed toward the primary service before the primary service receives the message;
reviewing, at the service wrap framework, the intercepted message to determine whether a feature has been requested by the first endpoint;
determining, by the service wrap framework, that at least one requested feature is not supported by the primary service;
identifying, by the service wrap framework, an entity that is capable of providing the at least one requested feature not supported by the primary service;
altering sender information associated with the intercepted message;
directing, by the service wrap framework, the intercepted message to the identified entity that is capable of providing the at least one requested feature not supported by the primary service;
receiving, at the service wrap framework, the message back from the identified entity; and
altering, by the service wrap framework, sender information associated with the message received from the identified entity.

2. The method of claim 1, wherein the identified entity that is capable of providing the at least one requested feature not supported by the primary service is a server capable of providing the requested feature; and
redirecting the message to the identified server instead of immediately forwarding the message to the primary service.

3. The method of claim 2, further comprising:
reviewing the message received back from the identified server to determine whether additional features have been requested by the first endpoint.

4. The method of claim 3, wherein the message received at the service wrap from the identified server includes a plurality of requested features, wherein at least one requested feature of the plurality of requested features is not supported by the primary service, and wherein at least one requested feature of the plurality of requested features is supported by the primary service.

5. The method of claim 1, wherein the message comprises a Session Initiation Protocol (SIP) message and wherein altering the sender information associated with the message comprises replacing the request URI field of the message with an address not associated with the first endpoint.

6. The method of claim 5, wherein the service wrap framework is located between the first endpoint and the primary service and wherein an address of the service wrap framework is placed in the request URI field of the message.

7. The method of claim 1, wherein the primary service comprises a SIP service.

8. The method of claim 1, further comprising:
forwarding the message to the primary service;
receiving a second message back from the primary service; and
forwarding the second message to at least one of the first endpoint and a second endpoint.

9. A non-transitory computer readable medium encoded with processor executable instructions that, when executed, perform the method of claim 1.

10. A communication system, comprising:
a primary service; and
a service wrap framework residing between the primary service and endpoints which utilize the primary service to provide features thereto, wherein the service wrap framework includes a non-transitory computer readable medium containing instructions to intercept a message from a first endpoint to the primary service before the primary service receives the message, review the message to determine whether a feature has been requested by the first endpoint, determine that at least one requested feature is not supported by the primary service, identify an entity that is capable of providing the at least one requested feature not supported by the primary service, alter sender information associated with the intercepted message, direct the intercepted message to the identified entity that is capable of providing the at least one requested feature not supported by the primary service, receive the message back from the identified entity, and alter sender information associated with the message received from the identified entity.

11. The system of claim 10, wherein the identified entity that is capable of providing the at least one requested feature not supported by the primary service is a server capable of providing the requested feature and the non-transitory computer readable medium of the service wrap framework contains instructions to redirect the message to the identified server.

12. The system of claim 11, wherein the non-transitory computer readable medium of the service wrap framework contains instruction to review the message received back from the identified server to determine whether additional features have been requested by the first endpoint.

13. The system of claim 10, wherein the message comprises a Session Initiation Protocol (SIP) message and wherein altering the sender information associated with the message comprises replacing the request URI field of the message with an address not associated with the first endpoint.

14. The system of claim 13, wherein an address of the service wrap framework is placed in the request URI field of the message and wherein the service wrap framework intercepts and analyzes all messages directed to and transmitted from the primary service.

15. The system of claim 10, wherein the primary service comprises a SIP service.

16. The system of claim 10, wherein the non-transitory computer readable medium of the service wrap framework contains instructions to forward the message to the primary service, receive a second message back from the primary service, and forward the second message to at least one of the first endpoint and a second endpoint.

17. The system of claim 10, wherein the message received at the service wrap from the first endpoint includes a plurality of requested features, wherein at least one requested feature of the plurality of requested features is not supported by the primary service, and wherein at least one requested feature of the plurality of requested features is supported by the primary service.

18. A communication device residing between a primary service and a first endpoint, the communication device including a non-transitory computer readable medium containing instructions to intercept all messages from the first endpoint to the primary service before the primary service receives the messages, review the messages to determine that at least one requested feature is not supported by the primary service, identify an entity that is capable of providing the at least one requested feature not supported by the primary service, alter sender information associated with the intercepted message, direct the intercepted message to the identified entity that is capable of providing the at least one requested feature not supported by the primary service, receive the message back from the identified entity, and alter sender information associated with the message received from the identified entity.

19. The device of claim 18, wherein the identified entity that is capable of providing the at least one requested feature not supported by the primary service is a server that is capable of providing the requested feature and the non-transitory computer readable medium of the service wrap framework contains instructions to redirect the message to the identified server.

20. The device of claim 18, wherein the message comprises a Session Initiation Protocol (SIP) message and wherein altering the sender information associated with the message comprises replacing a request URI field of the message with an address not associated with the first endpoint.

* * * * *